United States Patent
Eeckhout et al.

(10) Patent No.: US 11,010,182 B2
(45) Date of Patent: May 18, 2021

(54) INSTRUCTION WINDOW CENTRIC PROCESSOR SIMULATION

(71) Applicant: UNIVERSITEIT GENT, Ghent (BE)

(72) Inventors: Lieven Eeckhout, Evergem (BE); Stijn Eyerman, Evergem (BE); Wim Heirman, Ghent (BE); Trevor E. Carlson, Uppsala (SE)

(73) Assignee: UNIVERSITEIT GENT, Ghent (BE)

( * ) Notice: Subject to any disclaimer, the term of this patent is extended or adjusted under 35 U.S.C. 154(b) by 568 days.

(21) Appl. No.: 14/408,322

(22) PCT Filed: Jun. 17, 2013

(86) PCT No.: PCT/EP2013/062549
§ 371 (c)(1),
(2) Date: Dec. 16, 2014

(87) PCT Pub. No.: WO2013/189898
PCT Pub. Date: Dec. 27, 2013

(65) Prior Publication Data
US 2015/0193242 A1 Jul. 9, 2015

Related U.S. Application Data

(60) Provisional application No. 61/660,749, filed on Jun. 17, 2012.

(51) Int. Cl.
*G06F 9/455* (2018.01)
(52) U.S. Cl.
CPC ................ *G06F 9/45508* (2013.01)
(58) Field of Classification Search
CPC ............ G06F 11/3457; G06F 17/5022; G06F 9/45508; G06F 17/5009
USPC ......................................................... 703/22
See application file for complete search history.

(56) References Cited

U.S. PATENT DOCUMENTS

| | | | |
|---|---|---|---|
| 6,240,502 B1* | 5/2001 | Panwar ................ | G06F 9/3851 712/15 |
| 2006/0106923 A1* | 5/2006 | Balasubramonian ....................... | G06F 9/3836 709/223 |
| 2007/0016817 A1* | 1/2007 | Albonesi .................. | G06F 1/10 713/500 |

(Continued)

OTHER PUBLICATIONS

Wallace, Steven, and Nader Bagherzadeh. Performance issues of a superscalar microprocessor. Microprocessors and Microsystems. 1995 Elsevier Science. vol. 19 No. 4, May 1995. pp. 187-199.*

(Continued)

*Primary Examiner* — Kamini S Shah
*Assistant Examiner* — John E Johansen
(74) *Attorney, Agent, or Firm* — Workman Nydegger

(57) ABSTRACT

A method for simulating a set of instructions to be executed on a processor including performing a performance simulation of the processor over a number of simulation cycles. Modeling, in a frontend component, branch prediction and instruction cache is performed providing instructions to the instruction window, and modeling of an instruction window for the cycle is performed. From the simulation, a performance parameter of the processor is obtained without modeling a reorder buffer, issue queue(s), register renaming, load-store queue(s) and other buffers of the processor.

11 Claims, 3 Drawing Sheets

(56) References Cited

U.S. PATENT DOCUMENTS

| | | | |
|---|---|---|---|
| 2008/0028183 A1* | 1/2008 | Hwu | G06F 9/3836 712/20 |
| 2010/0169611 A1* | 7/2010 | Chou | G06F 9/3844 712/205 |
| 2011/0066419 A1* | 3/2011 | Chiou | G06F 30/367 703/14 |
| 2011/0295587 A1 | 12/2011 | Eeckhout et al. | |
| 2014/0208074 A1* | 7/2014 | Babayan | G06F 9/3851 712/206 |

OTHER PUBLICATIONS

Nakada, Takashi, and Hiroshi Nakashima. Design and implementation of a high speed microprocessor simulator BurstScalar. Modeling, Analysis, and Simulation of Computer and Telecommunications Systems, 2004.(MASCOTS 2004). Proceedings. The IEEE Computer Society's 12th Annual International Symposium on. IEEE, 2004. pp. 1-9.*

Taha, Tarek M., and Scott Wills. "An instruction throughput model of superscalar processors." IEEE Transactions on Computers 57.3 (2008). pp. 389-403.*

Ponomarev, Dmitry, Gurhan Kucuk, and Kanad Ghose. "AccuPower: An accurate power estimation tool for superscalar microprocessors." Design, Automation and Test in Europe Conference and Exhibition, 2002. Proceedings. IEEE, 2002. pp. 1-6.*

Austin et al., "SimpleScalar: An Infrastructure for Computer System Modeling," IEEE Computer, Feb. 2002, pp. 59-67, vol. 35, No. 2.

International Search Report for corresponding International PCT Application No. PCT/EP2013/062549, dated Sep. 18, 2013.

Lee, "A Superscalar Processor Model for Limited Functional Units Using Instruction Dependencies," 25th International Conference on Computers and Their Applications 2010, Mar. 24, 2010, pp. 294-299, Honolulu, Hawaii, USA.

Wallace et al., "Performance Issues of a Superscalar Microprocessor," Microprocessors and Microsystems, May 4, 1995, pp. 187-199, vol. 19, No. 4, IPC Business Press LTD, London, Great Britain.

Zhu et al., "An Integrated Performance and Power Model for Superscalar Processor Designs," Design Automation Conference 2005, Proceedings of the ASP-DAC 2005, Jan. 18, 2005, pp. 948-951, vol. 2.

* cited by examiner

INSTRUCTION WINDOW CENTRIC PROCESSOR SIMULATION

FIELD OF THE INVENTION

The invention relates to the field of processor architecture. More particularly, the present invention relates to methods and systems for simulating processors and their operation.

BACKGROUND OF THE INVENTION

Processor simulation is useful to evaluate various processor configurations without the hardware being available. Simulation is therefore heavily used during the design process of a new processor for evaluating design trade-offs and novel research ideas.

One of the first simulators was described by Austin et al. in IEEE Computer 35(2) (2002) 59-67, describing an architectural simulator for superscalar out-of-order processors. This was widely used in computer architecture research in the 1990s and early 2000. This architectural simulator models an out-of-order processor using a structure called the Register Update Unit (RUU) which models the instruction window of an out-of-order processor in its early days (such as the HP PA-8000; the instruction window was called the 'instruction reorder buffer' in the PA-8000). Later designs split up the instruction window into two separate structures, the reorder buffer and the issue queues (also called reservation stations); the reorder buffer contains all in-flight instructions and the issue queues only contain instructions that aren't finished yet with their execution. The latter was performed because it was realized that the increasingly complex processors could not be simulated anymore in an accurate manner by the simulator described by Austin. The split design meant in fact an efficiency optimization compared to the instruction window: the issue queue was smaller and therefore faster and more energy-efficient to perform the CAM lookups during issue. Contemporary simulators, such as GEMS, M5, PTLSim and others, model this split issue queue versus ROB design. Sim-alpha is a validated version of SimpleScalar to model the Alpha 21264 processor. Sim-alpha models the processor in much higher detail compared to SimpleScalar, including ROB, issue queues, clustered microarchitecture, register renaming, load-store buffers and queues.

At present, architects in industry and academia often rely heavily on cycle-level (and in some cases true cycle-accurate) simulators. The limitation of cycle-level simulation is that it is very time-consuming. Industry single-core simulators typically run at a speed of 1 KHz to 10 KHz; academic simulators typically run at tens to hundreds of KIPS (kilo instructions per second). Multi-core processor simulators exacerbate the problem even further because they have to simulate multiple cores, and have to model inter-core communication (e.g., cache coherence traffic) as well as resource contention in shared resources. Besides concerns regarding the development effort and time of detailed cycle-level simulators, this level of detail is not always appropriate, nor is it called for. For example, early in the design process when the design space is being explored and the high-level microarchitecture is being defined, too much detail only gets in the way. Or, when studying trade-offs in the memory hierarchy, cache coherence protocol or interconnection network of a multi-core processor, cycle-accurate core-level simulation may not be needed.

Current days, architectural simulation thus faces two major challenges. First, it is extremely time consuming: simulating an industry-standard benchmark for a single microprocessor design point easily takes a couple days or weeks to run to completion, even on today's fastest machines and simulators. Detailed processor simulation is very slow (5 to 6 orders of magnitudes slower than native execution), which reduces the number of configurations that can be explored in a limited time budget. Culling a large design space through architectural simulation of complete benchmark executions thus simply is infeasible. While this is already true for single-core processor simulation, the current trend towards multi-core processors only exacerbates the problem. As the number of cores on a multi-core processor increases, simulation speed has become a major concern in computer architecture research and development. Second, developing an architectural simulator is tedious, costly and very time consuming.

There have been two approaches to reduce simulation time in modern day architectural simulation: reducing the number of instructions to be executed and speeding up the simulation process itself. Reducing the number of instructions to be executed is done using sampling (SMARTS, SimPoint) or reduced synthetic traces (statistical simulation). Speeding up the simulation has been done using simple one-IPC models, which can be highly inaccurate. Another technique uses an analytical model (interval simulation), which cannot be used in all environments and for all purposes, and is less accurate than this invention.

There is still need for a simulator for accurately and fast simulating the complex processors of today.

SUMMARY OF THE INVENTION

It is an object of embodiments of the present invention to provide good methods and systems for accurately modeling a modern-day superscalar processor. Such modern-day superscalar processors typically comprise a reorder buffer, issue queue, rename unit, physical register file, load and store queues, and possibly other buffers.

It was surprisingly found that it is possible to accurately model a modern-day superscalar processor by modeling an instruction window although the design may consist of a reorder buffer and issue queue(s) along with a physical register file and load-store queue(s). Modeling only the instruction window is faster than the reorder buffer and issue queue(s) and related structures such as load/store queues, register renaming, etc., and it still provides sufficiently accurate results.

It is an advantage of embodiments of the present invention that simulation methods and systems can be provided having a reduced processor simulation time, while still producing accurate performance numbers.

It is an advantage of embodiments according to the present invention that a simulation technique faster than detailed simulation is obtained, while being more accurate than other simulation speedup techniques, such as for example one-IPC or interval simulation. It is an advantage that the simulation technique may be at least one order of magnitude faster than detailed simulation.

It is an advantage of embodiments according to the present invention that methods and systems are provided having a new, interesting, trade-off between accuracy and speed.

It is an advantage of embodiments according to the present invention that it can be used in most simulation environments, including timing and event-based environments.

It is an advantage of embodiments according to the present invention that it can model timing and reordering of external memory operations accurately, e.g. more accurately than interval simulation and one-IPC models.

It is an advantage of embodiments according to the present invention that it naturally handles effects such as issue contention, which typically cannot merely be modeled by models such as one-IPC and interval simulation.

Some aspects of the present invention are listed below.

In one aspect, the present invention relates to a method for simulating a set of instructions to be executed on a processor, the method comprising performing a performance simulation of the processor over a number of simulation cycles, wherein performing the performance simulation of the processor comprises modeling an instruction window for the cycle and deriving a performance parameter of the processor without modeling a reorder buffer, issue queue(s), register renaming, load-store queue(s) and other buffers of the processor.

The method may comprise modeling branch prediction and instruction cache in a frontend component providing instructions to the instruction window, and inserting instructions in the instruction window from the frontend component and modeling the progress of the instructions in the instruction window.

The method may comprise, for an instruction in the instruction window, identifying if all input registers of the instruction are available, and if all input registers of the instruction are available, scheduling the instruction for execution, taking into account the availability of functional units.

The method may comprise first transferring the instruction to a ready list, and, in the cycle following the transferring, scheduling the instruction for execution.

The method may comprise setting a status of an instruction to executed after the instruction has been executed.

The method may comprise removing the instruction from the instruction window if it is at the head of the instruction window and has finished its execution.

The method may comprise stalling the execution of load instructions until required data is fetched.

The method may comprise verifying that the issue queue(s), a physical register file and the load-store queue(s) are balanced in relation to the size of the reorder buffer so that these are not exhausted before the reorder buffer is exhausted, during the processing of instructions.

The method may comprise, after said performance simulating, adjusting a processor design used for simulating the processing and performing the performance simulation using the adjusted processor design.

The method may comprise preventing instructions from entering the instruction window for an amount of time if modeling the branch prediction and instruction cache revealed occurrence of a branch misprediction or an instruction cache miss. In case of a branch misprediction, no instructions may be entered until the branch is executed and after that, for another few cycles no instructions are entered to model the front-end refill. For an instruction cache miss, the time no instructions are entered in the instruction window equals the latency of the cache miss.

In one aspect, the present invention also relates to a simulator for simulating the processing of a set of instructions to be executed on a processor, the simulator comprising a performance simulator for performing a performance simulation of the processor over a number of simulation cycles, wherein the performance simulator of the processor is adapted for modeling an instruction window for the cycle and deriving a performance parameter of the processor without modeling a reorder buffer, issue queue(s), register renaming, load-store queue(s) and other buffers of the processor.

The simulator may be a computer program product for, when executing on a computer, performing a simulation of the processing of a set of instructions to be executed on a processor. It may perform a method according to any of the methods as described above.

In another aspect, the present invention also relates to a data carrier comprising a set of instructions for, when executed on a computer, performing a performance simulation of processing of a set of instructions to be executed on a processor over a number of simulation cycles, wherein performing the performance simulation of the processor comprises modeling an instruction window for the cycle and deriving a performance parameter of the processor without modeling a reorder buffer, issue queue(s), register renaming, load-store queue(s) and other buffers of the processor.

The data carrier may be any of a CD-ROM, a DVD, a flexible disk or floppy disk, a tape, a memory chip, a processor or a computer.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
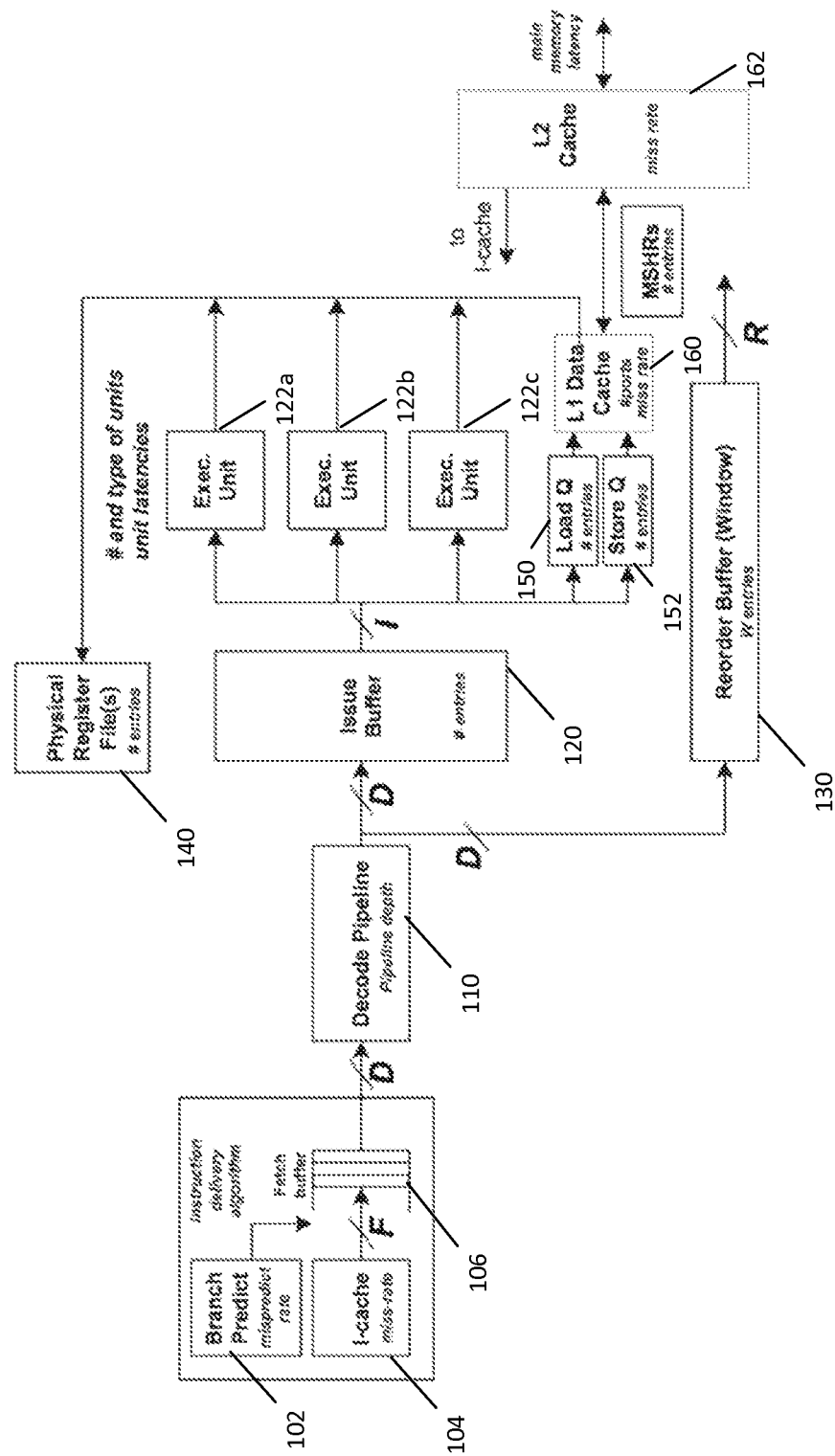
FIG. 1 illustrates a schematic representation of a processor and its components that can benefit from a method for simulating according to an embodiment of the present invention.
Figure 2:
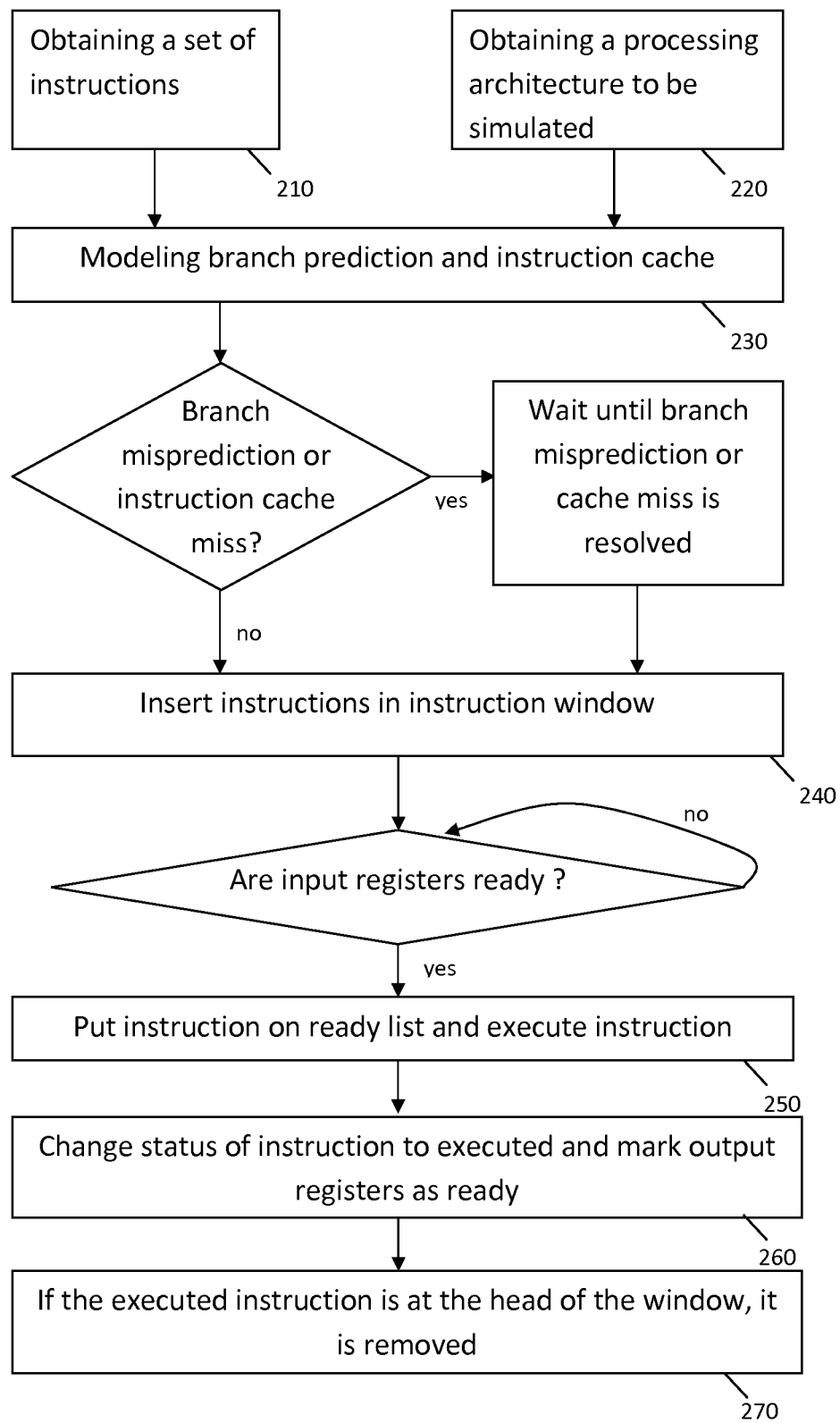
FIG. 2 illustrates a flow chart of an exemplary method according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Embodiments of the present invention relate to simulation of the operation of processors, e.g., in order to optimize or improve their architecture or design. By way of illustration an exemplary processor for which a simulation according to embodiments of the present invention could be performed is first provided, introducing different standard or optional components. It is to be noticed that the processor described is only one example of a processor that could benefit from the method and system according to an embodiment of the present invention, embodiments of the present invention therefore not being limited thereto. Furthermore, some other terminology related to processing of instructions also is introduced, whereby the use of particular terminology when describing certain features or aspects of the invention should not be taken to imply that the terminology is being re-defined herein to be restricted to include any specific characteristics of the features or aspects of the invention with which that terminology is associated.

Where in embodiments according to the present invention the term "functional simulation" is used, reference is made to simulation wherein the functionality of the different components of a processor or multi-processor system are taken into account, but wherein no performance is simulated.

Where in embodiments according to the present invention the term "performance simulation" is used, reference is made to simulation wherein the performance of the processor is simulated.

A possible processor that could benefit from embodiments of the present invention is shown in FIG. 1. FIG. 1 illustrates a generic superscalar out-of-order processor 100. It shows a branch predictor 102, which typically may be a digital circuit that tries to guess which way a branch instruction will go in order to improve the flow of instructions in the pipeline of the processor 100. The processor comprises an I-cache 104 for caching instructions. Using an instruction delivery algorithm the instructions are provided to a Fetch buffer 106 and thereafter transferred to a decode pipeline 110 having a front-end pipeline depth. From the front-end pipeline, the instructions are routed to an issue buffer 120 for buffering instructions to be executed on the execution units, potentially out of program order, and a reorder buffer 130, for allowing instructions to be committed in program order. From the issue buffer 120, the instructions and data are distributed over at least one execution unit, also referred to as functional units 122a, 122b, 122c, . . . . The output may be provided to the physical register file(s) 140. Load and store instructions are kept track of in a Load Q 150 and Store Q 152 allowing for speculative out-of-order execution of memory instructions. Data in the Load Q 150 and Store Q 152 can then be provided from and to a first level data cache memory 160, respectively; the Load Q 150 may provide results to the physical register file(s) 140. The first level data cache memory 160 is in communication with the second level cache memory 162 via MSHRs (Miss Status Handling Registers), which keep track of the outstanding memory requests. The second level cache memory, also referred to as L2 cache, typically is integrated on-chip. Optionally, there may be additional levels of cache, L3 and L4, integrated either (partially) on-chip or off-chip. Further standard and optional components of such a system also may be present (e.g., prefetch units to anticipate memory accesses and bring data in the caches pro-actively, and Translation Lookaside Buffers for caching virtual to physical address translations), as known by the person skilled in the art.

Furthermore, following definitions could apply to the terminology used in the application.

A cache miss refers to a failed attempt to read or write a piece of data in the cache, resulting in a latency of the memory access.

Where reference is made to a multi-core system, reference is made to a processor comprising a plurality of executing processing parts (processor cores) that can operate simultaneously.

Where reference is made to the cache hierarchy, reference is made to the system in computer storage distinguishing each level of memory or cache by access latency and size thus forming a hierarchy. Typically, the size and access latency is smaller for the L1 cache compared to the L2 cache; the size and access latency of the L2 cache is smaller compared to the L3 cache; etc.

Where in embodiments of the present invention reference is made to an instruction window, reference is made to a group of instructions actively processed in parallel, or to the corresponding size or maximum size of either such a group or its containing facility.

Where in embodiments of the present invention reference is made to a re-order buffer (ROB) reference is made to the buffer wherein re-ordering of instructions occurs such that these can be executed out-of-order and committed in order.

Where in embodiments of the present invention reference is made to the load-store queues or buffers, reference is made to a specialized hardware elements that loads data from memory or stores it back to memory from registers.

Where in embodiments of the present invention reference is made to the register renaming, reference is made to refers to a technique used to avoid unnecessary serialization of program operations imposed by the reuse of registers by those operations.

Where in embodiments of the present invention reference is made to issue queues, reference is made to an issue queue, reference is made to a queue wherein instructions are stored before they are issued.

In a first aspect, embodiments of the present invention relate to a method for simulating a set of instruction to be executed on a processor. Such a method for simulating comprises performing a performance simulation of the processor, by some also referred to as a system for processing or as a processing system (e.g. a processor-core, the combination of the processor-core with a set of other components allowing operation, a coarse-grained, fine-grained, clustered or simultaneous multi-threading processor, a single-chip multi-core based processor or a multi-chip multiprocessor), over a number of simulation cycles. Where reference is made to a performance simulator, reference also may be made to a timing simulator. According to embodiments of the present invention, performing the performance simulation of the processor comprises modeling an instruction window for the cycle and deriving a performance parameter of the processor without modeling a reorder buffer, issue queue(s), register renaming, load-store queue(s) and other buffers of the processor. In particular embodiments, the method may comprise modeling branch prediction and instruction cache in a frontend component, inserting instructions in the instruction window from the frontend component and modeling the progress of the instructions in the instruction window. As the modeling is essentially based on modeling of the instruction window, the modeling can also be referred to as instruction window centric processor modeling.

It has surprisingly been found that the performance of an out-of-order processor can be accurately analyzed by looking at the number of instructions that can enter the instruction window per cycle. This means that only the instruction window needs to be modeled for accurate performance modeling, and that the penalty of a miss event is the time it prevents instructions to enter the instruction window, e.g. because there are no instructions to be dispatched or because the instruction window is full. According to embodiments of the present invention, the method results especially in accurate simulation and basically when it can be assumed, or e.g. upon verification, that the architecture is well-balanced with respect to the width and the size of re-order buffer (ROB) of the processor.

By way of illustration, embodiments of the present invention not being limited thereto, standard and optional features and advantages of embodiments of the present invention are illustrated using an exemplary method according to one particular embodiment.

In a first and second step, the method for simulating 200 the processing of a set of instructions in a processor comprises obtaining a set of instructions 210 and obtaining a processing architecture 220 for which the simulation is to be made. Obtaining a set of instructions 210 may for example comprise obtaining a set of instructions typically used for benchmarking simulations. Alternatively or in addition thereto, also a set of custom-made instructions could be used, e.g., if the processing quality with respect to a particular task is to be evaluated. Obtaining a processing architecture 220 may comprise obtaining the different components, their interconnectivity and their properties, such that accurate simulation can be made. The above data may already be stored in the simulation environment or may be retrieved via an input port in the simulator or simulation system. The input typically may be provided by a functional simulator. Typical input that may be used for the performance simulator can be for example instruction type, inputs, outputs, memory addresses, etc.

The input is provided to the modeling system and in a following step 230, the branch prediction and the instruction cache is modeled in a frontend modeling component. The frontend modeling component determines whether branch mispredictions or instruction cache misses occur. When a branch misprediction or instruction cache miss occurs, the frontend stalls and no instructions enter the instruction window for a certain amount of time. The frontend model can model all of the frontend pipeline stages of the processor, or can be abstracted to one stage. When no branch misprediction or instruction cache miss occurs, the frontend model component provides instructions to the instruction window. In other words, after traversing the frontend pipeline, instructions are inserted (dispatched) into the instruction window, where they stay until they are committed. The step of inserting the instructions in the instruction window is indicated by step 240.

Instructions in the instruction window can either be waiting, ready, executing or done. Waiting instructions are instructions whose input registers are not yet ready and need to be produced by other instructions. After dependency tracking (in the frontend pipeline), each instruction has a list of consumers, pointing to instructions that consume the data produced by this instruction. In this way, it is clear which input registers need to be available for a certain instruction. When a previous instruction finishes its execution, it sets its output register(s) for all its consumers to ready in the instruction window.

If all previous instructions on which the instruction under study depends are executed and have provided their output, this will render that all input registers of the instruction under study are ready, so the instruction under study is ready to be executed and is put into a ready list, as indicated in step 250. Every cycle, the ready list is scanned and instructions are scheduled to execute, depending on the availability of functional units. Loads are sent to the load-store unit.

Instructions are executed as soon as the input operands (possibly provided by other instructions) are ready. It can happen that instructions start executing late, when they are almost at the head of the window, and that they are still executing when they are at the head. Then they cannot commit and leave the instruction window, which can cause the window to fill up (since it's limited in size) and prevents new instructions to enter the window (stalling the processor). Typical instructions for which this may occur are load instructions that causes a cache miss. This behavior is modeled in a natural way in the window centric model, by stating that only fully executed instructions can commit and leave the window.

Loads execute as soon as their address (=input to the load) is known (so they do not wait until they are at the head of the window). Their execution finishes when the data is fetched (which can be after they reach the head of the window). Stores write data to the memory, and should only be done at commit time, to prevent speculative memory updates. So stores perform their memory access when they commit, so when they reach the head of the window. Once instructions are executed, their status is set to executed, as indicated in step 260. If the executed instruction is at the head of the instruction window, it is committed, i.e. removed from the instruction window, as illustrated by step 270. The instruction then contributes to the number of instructions that can be processed during the time frame envisaged. The output of the performance simulator thus may be an estimation of the timing of the instructions. By evaluating the number of instructions that can be processed in a given time frame, the processing properties of the processor can be determined and evaluation can be made.

In a second aspect, the present invention relates to a simulator, also referred to as simulation system, for performing a simulation of the processing of a set of instructions by a processor. Such a simulator typically may be computer implemented. The simulator according to embodiments of the present invention typically may comprise an input means for receiving a set of instructions and for receiving a processor architecture or design describing the processor. The simulator according to embodiments of the present invention also comprises a performance simulator for performing a performance simulation of the processor architecture or design. According to embodiments of the present invention, the performance simulator is adapted for modeling an instruction window for the cycle and deriving a performance parameter of the processor without modeling a reorder buffer, issue queue(s), register renaming, load-store queue(s) and other buffers of the processor.

Figure 3:
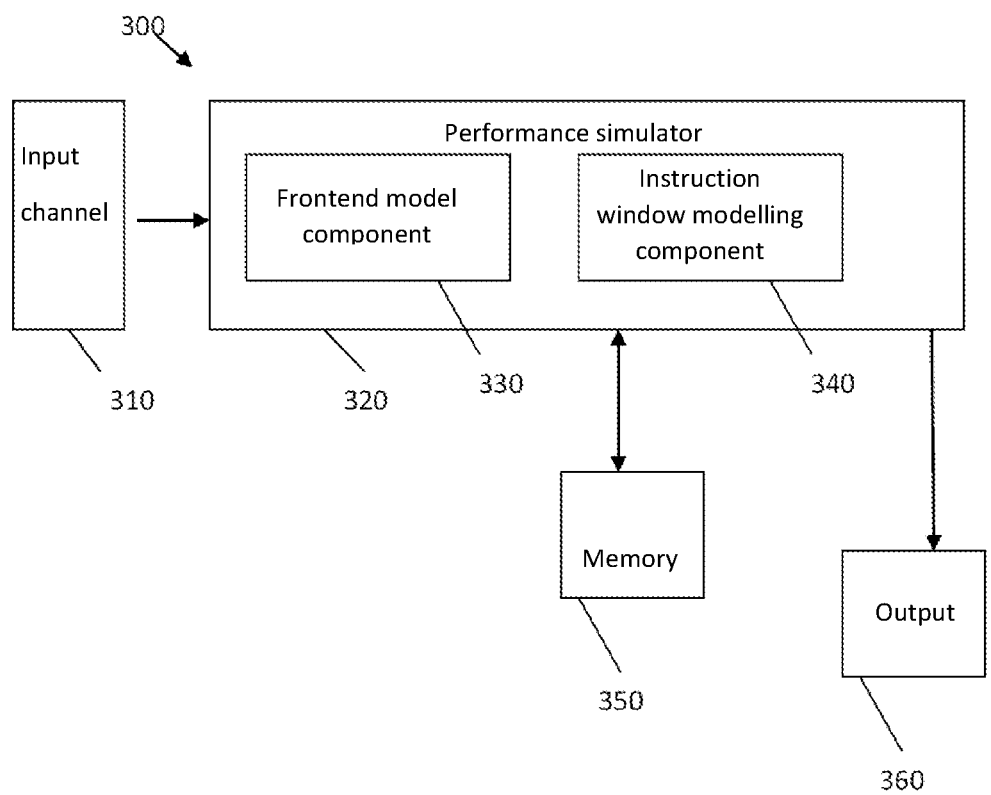
FIG. 3 illustrates a schematic overview of the simulator according to an embodiment of the present invention.

An example of such a simulator is shown in FIG. 3. The simulator 300 shows an input means or input channel 310. Such input means or input channel may for example comprise a functional simulator, providing input to the performance simulator which may for example be the instruction type, inputs, outputs, memory addresses, etc. The functional simulator may be any type of existing functional simulator. The simulator 300 also comprises a performance simulator 320 and an output channel 330. The performance simulator 320 may be equipped with a frontend model 330 component for modeling branch prediction and instruction cache. The performance simulator according to embodiments of the present invention comprises an instruction window modeling component 340 for modeling an instruction window for the cycle and deriving a performance parameter of the processor without modeling a reorder buffer, issue queue(s), register renaming, load-store queue(s) and other buffers of the processor. Further optional features and components may also be incorporated in the simulator as will be known by the person skilled in the art. For example, initial input, intermediate results and/or output results may be stored, e.g. temporarily, in a memory 350. Also features and components having the functionality as expressed in any of the steps of the method for simulating the processor as described in the first aspect may be included in the simulator 300. The system also may comprise an output 360 for outputting information regarding the processing properties of the processor simulated. The simulator may in one embodiment be a software system. In another embodiment, the simulator may be a hardware computer system, some components being implemented by software or as particular hardware components.

Figure 4:
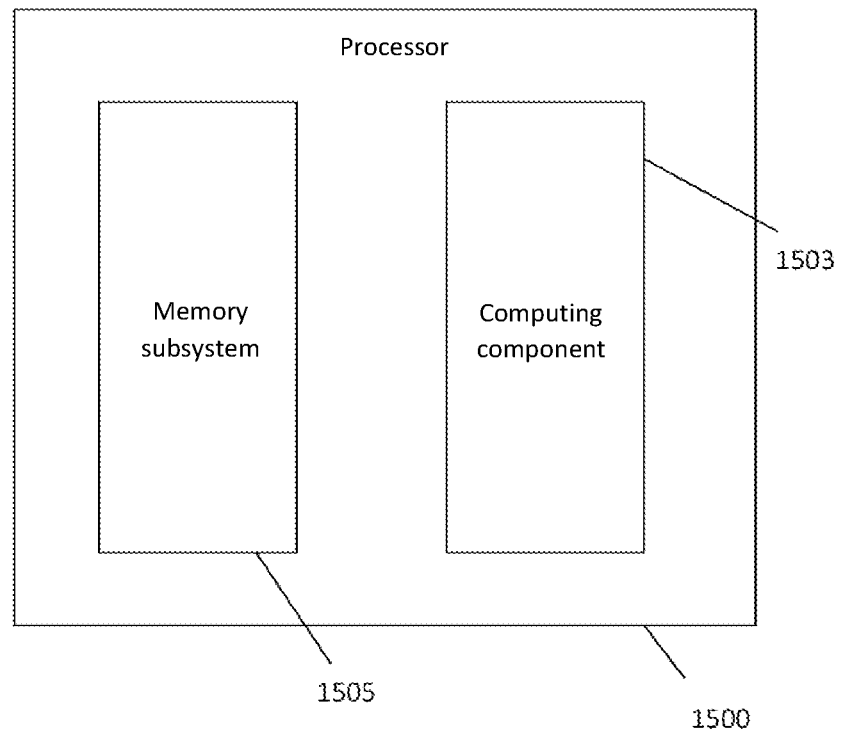
FIG. 4 illustrates a computing system that can be used for implementing the simulator according to an embodiment of the present invention.

The above described system embodiments for simulating the execution of a set of instructions on a processor may correspond with an implementation of the method embodiments for simulating the execution of a set of instructions on a processor as a computer implemented invention in a processor 1500 such as shown in FIG. 4. FIG. 4 shows one configuration of a processor 1500 that includes at least one programmable computing component 1503 coupled to a memory subsystem 1505 that includes at least one form of memory, e.g., RAM, ROM, and so forth. It is to be noted that the computing component 1503 or computing components may be a general purpose, or a special purpose computing component, and may be for inclusion in a device, e.g., a chip that has other components that perform other functions. Thus, one or more aspects of the present invention can be implemented in digital electronic circuitry, or in computer hardware, firmware, software, or in combinations of them. For example, each of the simulation steps may be a computer implemented step. Thus, while a processor 1500 such as shown in FIG. 4 is prior art, a system that includes the instructions to implement aspects of the methods for simulating execution of processing of a set of instructions is not prior art, and therefore FIG. 4 is not labeled as prior art. The present invention thus also includes a computer program product which provides the functionality of any of the methods according to the present invention when executed on a computing device.

In another aspect, the present invention relates to a data carrier for carrying a computer program product for simulating the processing of a set of instructions by a processor. Such a data carrier may comprise a computer program product tangibly embodied thereon and may carry machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

The invention claimed is:

1. A method for simulating a set of instructions to be executed on a processor, the method comprising
performing a performance simulation of the processor over a number of simulation cycles, wherein performing the performance simulation of the processor comprises
obtaining from a storage or an input port a set of instructions and a processing architecture of the processor for which the simulation is to be made,
modeling an instruction window for the cycle, said modeling comprising modeling, in a frontend component, branch prediction and instruction cache providing instructions to the instruction window;
inserting said instructions obtained from the frontend component directly into the instruction window and modeling the progress of the instructions in the instruction window,
the method further comprising preventing instructions from entering the instruction window for an amount of time if modeling the branch prediction and instruction cache revealed occurrence of a branch misprediction or instruction cache miss, wherein in response to the branch misprediction no instructions are entered until the branch is executed and no instructions are entered for a number of cycles after the branch is executed to model frontend refill, and wherein in response to the instruction cache miss the amount of time during which no instructions are entered in the instruction window equals a latency of the instruction cache miss,
recording an estimation of the timing of the instructions,
generating the number of instructions processed in a period of time, and
producing a performance parameter of the processor from the estimation of the timing of the instructions and the number of instructions processed in the period of time, the performance parameter of the processor being produced without modeling a reorder buffer, issue queue(s), register renaming, load-store queue(s) and additional buffers of the processor.

2. A method for simulating according to claim 1, wherein the method comprises, for an instruction in the instruction window:
identifying if all input registers of the instruction are available; and
if all input registers of the instruction are available, scheduling the instruction for execution, taking into account the availability of functional units.

3. A method for simulating according to claim 1, wherein the method comprises first transferring the instruction to a ready list, and, in the cycle following the transferring, scheduling the instruction for execution.

4. A method for simulating according to claim 1, wherein the method comprises setting a status of an instruction to executed after the instruction has been executed.

5. A method for simulating according to claim 1, wherein the method comprises removing the instruction from the instruction window if it is at the head of the instruction window and has finished its execution.

6. A method for simulating according to claim 1, wherein the method comprises stalling the execution of load instructions until required data is fetched.

7. A method for simulating according to claim 1, wherein the method comprises verifying that the issue queue(s), a physical register file and the load-store queue(s) are balanced in relation to the size of the reorder buffer so that these are not exhausted before the reorder buffer is exhausted, during the processing of instructions.

8. A method according to claim 1, the method comprising, after said performance simulating, adjusting a processor design used for simulating the processing and performing the performance simulation using the adjusted processor design.

9. A method according to claim 1, wherein performing a performance simulation of the processor comprises performing a performance simulation of a multi-threading processor or a multi-core processor.

10. A data carrier being a non-transitory computer readable medium comprising a set of instructions for, when executed on a computer, performing a performance simulation of processing of a set of instructions to be executed on a processor over a number of simulation cycles, wherein performing the performance simulation of the processor comprises:
modeling an instruction window for the cycle, said modeling comprising modeling, in a frontend component, branch prediction and instruction cache providing instructions to the instruction window; and
producing a performance parameter of the processor from an estimation of a timing of the instructions and a number of instructions processed in a period of time, the performance parameter of the processor being produced without modeling a reorder buffer, issue queue(s), register renaming, load-store queue(s) and additional buffers of the processor;
wherein performing the performance simulation of the processor further comprises preventing instructions from entering the instruction window for an amount of time if modeling the branch prediction and instruction cache revealed occurrence of a branch misprediction or instruction cache miss, wherein in response to the branch misprediction no instructions are entered until the branch is executed and no instructions are entered for a number of cycles after the branch is executed to model frontend refill, and wherein in response to the instruction cache miss the amount of time during which no instructions are entered in the instruction window equals a latency of the instruction cache miss.

11. A data carrier according to claim 10, wherein the data carrier is selected from the group consisting: CD-ROM, a DVD, a flexible disk or floppy disk, a tape, a memory chip, a processor and a computer.

* * * * *